United States Patent [19]

Lundahl

[11] 3,715,129

[45] Feb. 6, 1973

[54] SUSPENSION SYSTEM

[75] Inventor: Ezra Cordell Lundahl, Idaho Falls, Idaho

[73] Assignee: Ezra C. Lundahl, Inc., Logan, Utah

[22] Filed: Feb. 22, 1971

[21] Appl. No.: 117,574

[52] U.S. Cl. .........................................280/104.5 R
[51] Int. Cl. ................................................B60g 5/06
[58] Field of Search ...........280/104.5 R, 104.5 A, 81

[56] References Cited

UNITED STATES PATENTS 2,919,928   1/1960   Hoffer...........................280/104.5 A

*Primary Examiner*—Philip Goodman
*Attorney*—Lynn G. Foster

[57] ABSTRACT

A bracket-supported suspension system for a hay wagon or the like capable of being operated over relatively rough terrain, comprising method and apparatus which allow continuous ground contact of a plurality of support wheels over such irregular terrain as is encountered in day-to-day farming and further readily accommodates tilting of the vehicle in respect to the wheels to load or unload cargo. The apparatus is designed to absorb terrain irregularities such as or similar to those developed by furrows or small ditches without immobilizing the hay wagon and damp the magnitude of any such irregularities transferred to the hay wagon. The illustrated suspension system comprises a tripod support including three wheels, two mounted in laterally-spaced relation to absorb lateral irregularities encountered by the wheel set and one mounted in longitudinally-spaced relation to the other two to absorb longitudinal terrain irregularities. All wheels float or travel over the ground with individual floatation area unaffected by the action of the single wheel action.

5 Claims, 9 Drawing Figures

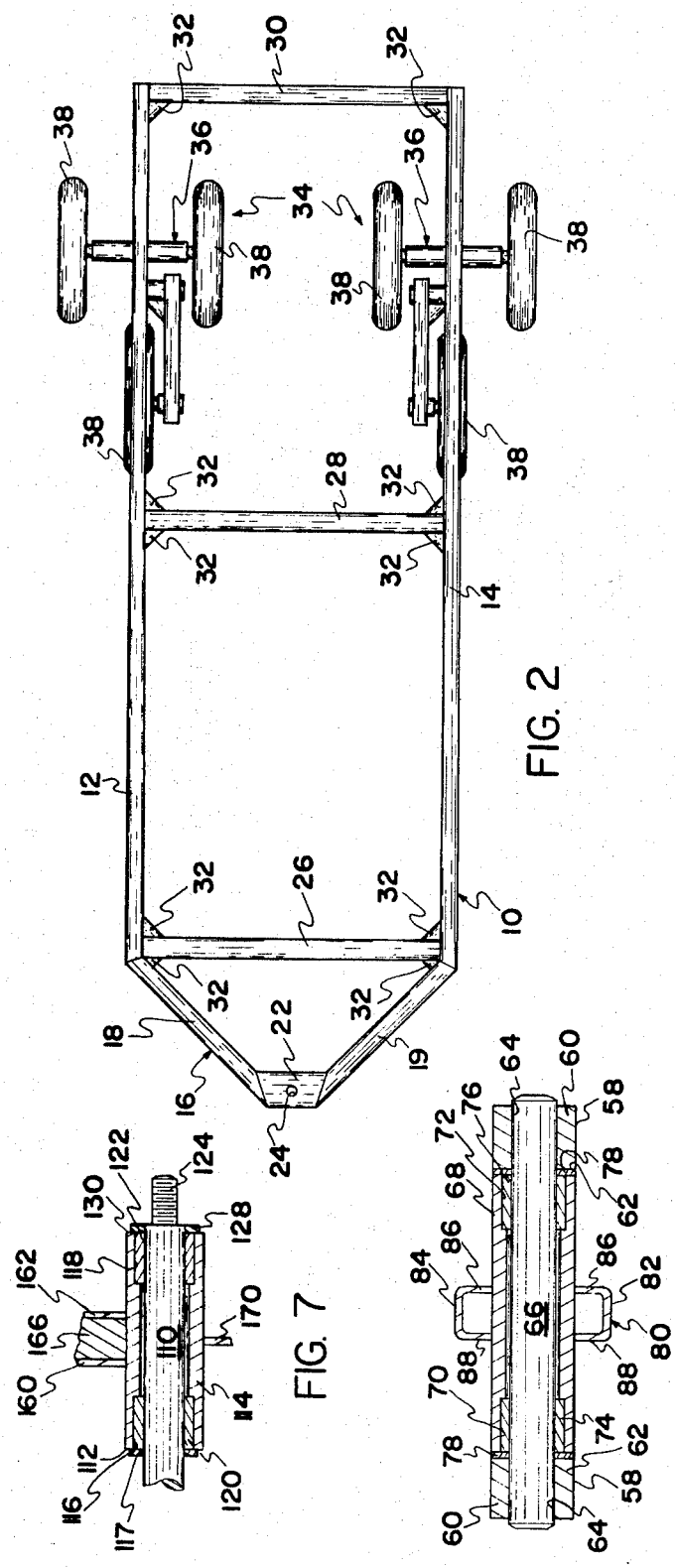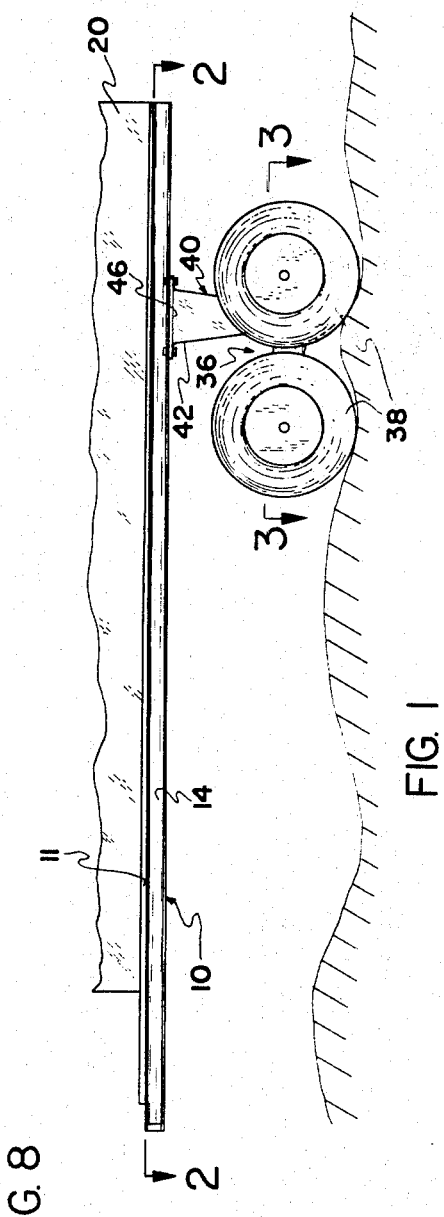

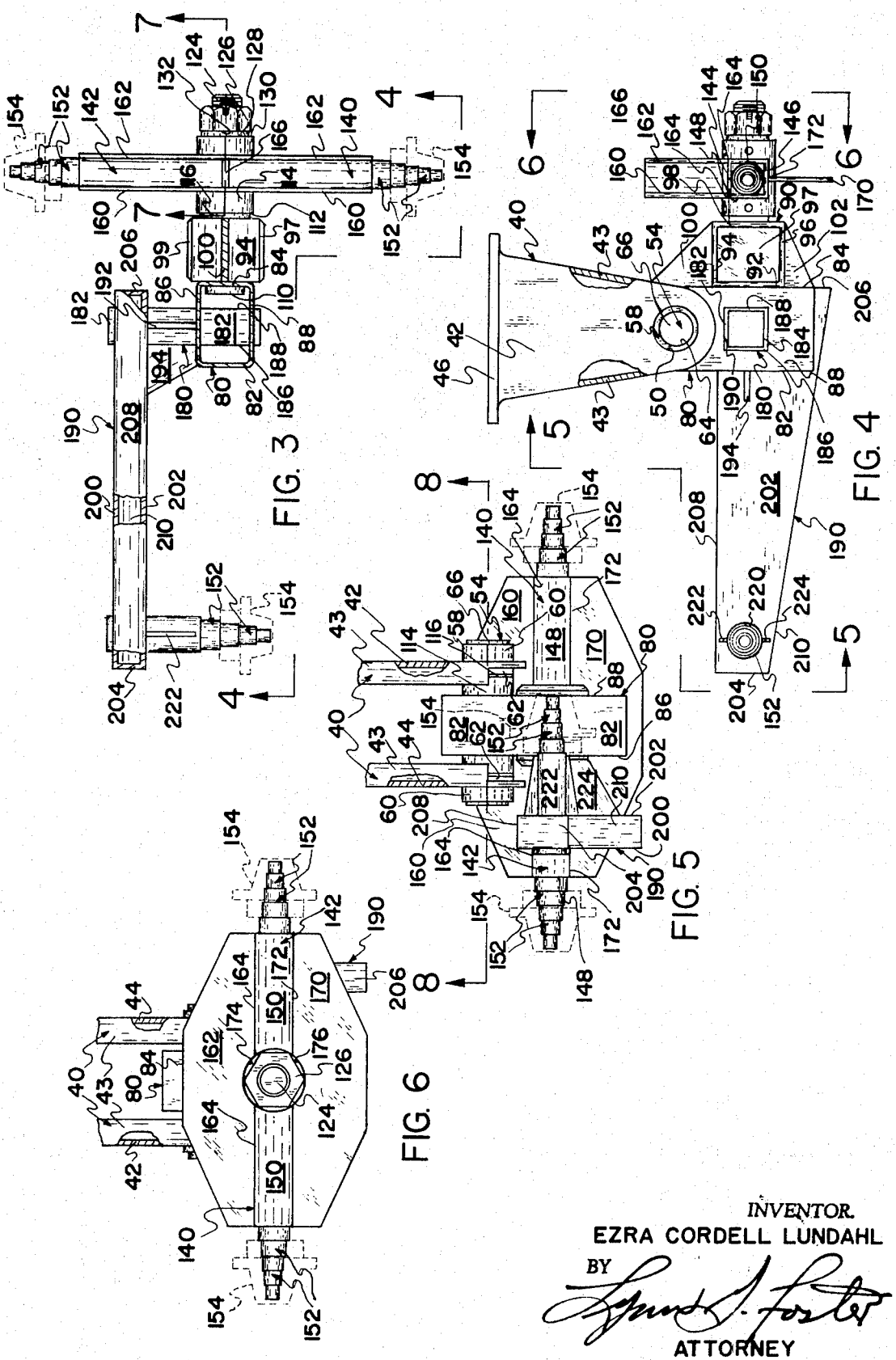

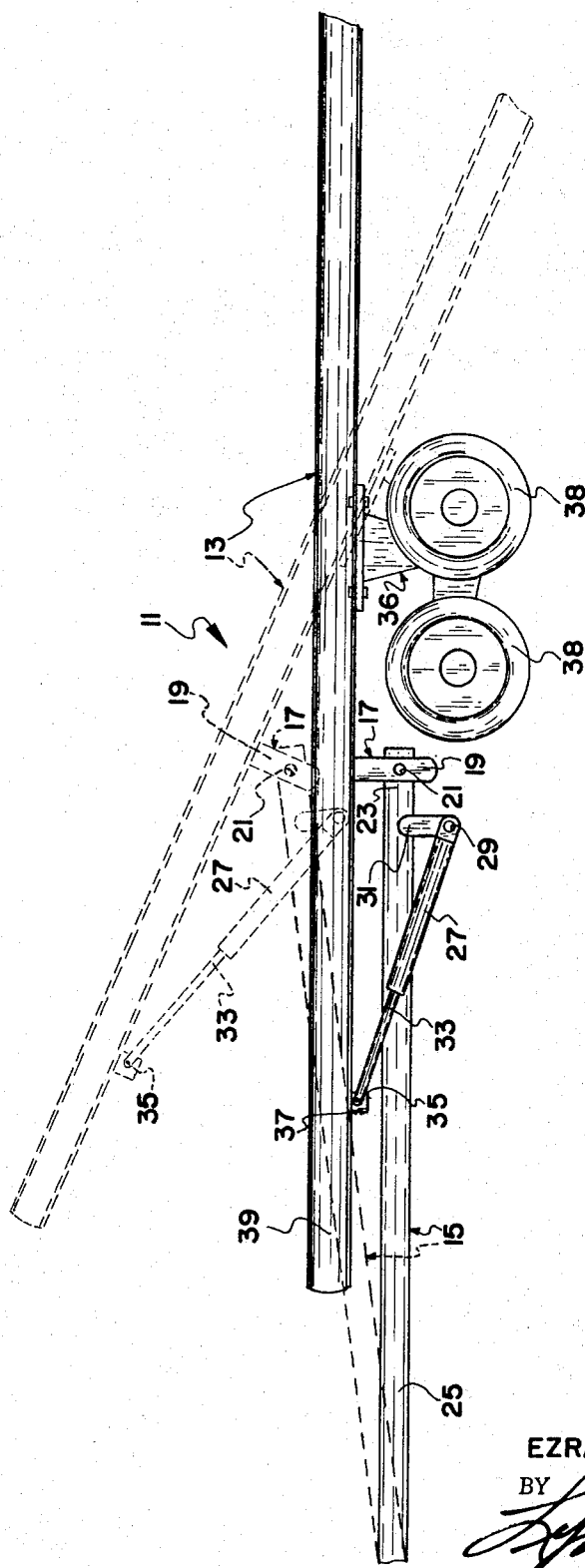

SUSPENSION SYSTEM

BACKGROUND

1. Field of the Invention

This invention relates generally to a suspension system and more specifically to suspension apparatus and methods to carry heavy loads and operate on soft, irregular terrain and to accomodate tilting of the vehicle frame in respect to the wheels. The present invention is intended to comprise part of farm or like equipment wherein two, three or four of the present suspension units are used to support a trailer or vehicle carrying a load. Each suspension unit comprises a mount attaching the unit to the frame of the vehicle or trailer, a set of three wheels and pivotable connecting structure allowing relative up and down movement of one wheel in respect to another wheel to negotiate ground irregularities while damping the magnitude of any irregularity transferred to the vehicle or trailer and without stalling the vehicle or trailer in the irregularities and further allows tilting of thy vehicle frame. The main walking beam also equalizes the hood in relationship to the three wheels.

2. Prior Art

The known prior art relates generally to on-the-road vehicle suspension systems which are not operable to negotiate rough terrain.

Much of the prior art is concerned with turning mechanisms for power wheels of large load-carrying vehicles in which more than one wheel serves as the support point to carry the load.

BRIEF SUMMARY AND OBJECTS OF THE PRESENT INVENTION

The present invention relates to a vehicle suspension system comprising a three-point wheel support and structure which allows each wheel to be displaced in respect to the others while maintaining the vehicle in an essentially level attitude, as the vehicle negotiates over irregular framing and like terrain. Weight-to-area ratios at the ground-engaging wheel locations prevent the vehicle from becoming stuck in soft or wet terrain encountered in farming or the like. The frame of the vehicle can be pivoted at the suspension system in respect to the wheels for loading and unloading cargo.

It is a primary object of the present invention to provide a novel suspension system for vehicles, comprising method and apparatus.

Another paramount object of this invention is the provision of a suspension system for a vehicle which defines improved three-point wheel support and other structure whereby one wheel may be displaced relative to another wheel as it follows irregular terrain, while the body of the vehicle is not correspondingly displaced.

Another significant object of the present invention is the provision of a suspension system for a vehicle defining improved three-point wheel support structure which distributes the weight and the load of the vehicle so as to prevent the vehicle from becoming stuck in soft or wet terrain.

It is also a principal object to provide a novel vehicle suspension system which permits tilting of the vehicle frame in respect to the wheels.

These and other objects and features of the present invention will become more fully apparent from the following description and appended claims taken in conjunction with the accompanying drawings.

BRIEF DESCRIPTION OF THE DRAWINGS

FIG. 1 is a side elevation of a presently preferred suspension system according to the present invention shown mounted to and supporting a frame of a vehicle;

FIG. 2 is a top plan view taken along line 2—2 of FIG. 1;

FIG. 3 is a top plan view of one three-point wheel support structure of the suspension system of the present invention taken along line 3—3 of FIG. 1, with the wheels and the vehicle-connecting bracket removed;

FIG. 4 is a side elevation taken along lines 4—4 of FIG. 3 and further including the vehicle-connecting bracket;

FIG. 5 is a front elevation taken along lines 5—5 of FIG. 4;

FIG. 6 is a rear elevation taken along line 6—6 of FIG. 4;

FIG. 7 is a cross-section taken along line 7—7 of FIG. 3;

FIG. 8 is a cross-section taken along line 8—8 of FIG. 5; and

FIG. 9 is a side elevation view of the presently preferred suspension system of this invention shown mounted to a tilting frame of a vehicle.

DETAILED DESCRIPTION OF THE ILLUSTRATED EMBODIMENT

Specific reference is now made to FIGS. 1 and 2 which illustrate one way in which a suspension system according to the present invention may be associated with the frame 10 of a vehicle. While only two vehicle frames are illustrated, it is to be appreciated that the present suspension system can be readily mounted to and used to support any number of diverse vehicles. The frame 10 is rigid in its nature and accommodates the mounting of a floor 11 across its top surface, upon which a cargo or load 20 may be placed and carried across irregular terrain such as farming land. The cargo or load may be of any type, such as feed, fertilizer, hay or other produce.

Specifically, the frame 10 comprises a pair of longitudinal members 12 and 14, shown as I beams, which are joined by a convergent tongue 16 comprising diagonal members 18 and 19 joined by a gusset 22. The gusset 22 contains a hole 24 through which a pin or the like may be placed in order that the vehicle comprising frame 10 may be displaced by another motorized vehicle (not shown). Naturally, if desired, the suspension system of the present invention may be used to support a motor-driven vehicle. The diagonal members 18 and 19 are respectively welded to or otherwise integrally fastened to the gusset plate 22 and are, in like manner, respectively integral with longitudinal frame members 12 and 14.

The longitudinal members 12 and 14 are rigidly joined one to another by three cross braces 26, 28 and 30, each of which are welded or otherwise rigidly fastened at each end to the longitudinal members. Stress distributing gusset plates 32 span the corners formed at the junctures between the longitudinal frame members and the cross frame members.

Alternatively the frame 11, illustrated in FIG. 9, may be utilized. The frame 11 is rigid in its nature, comprising two pivotally related members. Specifically, the bed 13 of frame 11 is related to the undercarriage 15 at spaced connectors 17 on each side of the frame, only one of which is illustrated. Each connector 17 comprises an apertured lug 19 and a pin 21, suitably journalled in lug 19 and in turn rigidly fastened at its inside end to the outside vertical surface of the trailing end 23 of the undercarriage 15. The ear of lug 19 is suitably secured, as by welding, to the underside of the bed 13. The bed 13 and undercarriage 15 may be constructed in conventional ways and no further explanation of the exact structural makeup of bed 13 and undercarriage 15 is deemed necessary. The undercarriage 15 terminates at its forward end in a tongue 25 so that no hitch is shown.

The bed 13 and undercarriage 15 are further interconnected by two cylinders, 27 on each side of the frame 11, only one of which is illustrated. The trailing end of each cylinder 27 is pivotally connected at pin 29 to a lug 31, which lug is rigidly mounted, as by welding, to the trailing end 23 of the undercarriage 15. The piston rod 33 of each cylinder 27 is pivotally connected at pin 35 to lug 37, which in turn is rigidly mounted, as by welding, to the underside of the bed 13 toward the leading end 39 thereof. A suitable hydraulic system (not shown) is provided for actuating the cylinders 27. When the cylinders 27 are retracted, the bed 13 and undercarriage 15 are disposed in the positions illustrated in solid lines in FIG. 9. When the cylinders 27 are actuated to extend the piston rods 33, the dotted line positions are obtained. The dotted line position is accomodated by the yet to be described suspension system 34, which consists of three-point wheel support structures 36. In the dotted position, loading and unloading of cargo from bed 13 is readily facilitated.

The suspension system 34 of the present invention, as illustrated, comprises two three-point wheel support structures 36, which are identical, though opposite hand. Each support structure 36 is interposed between the frame 10 of the vehicle and the ground and each define three wheel locations. Each wheel location is illustrated as a single wheel 38, although dual or tandem wheel configurations could be used.

Each suspension system support structure 36 is mounted to the vehicle frame 10 by a mounting or vehicle-connecting bracket 40, each mounting bracket 40 comprising a pair of vertically-directed hanger plates 42 and 44 (FIG. 5) with edge flanges 43, which plates are welded or otherwise suitably secured to a horizontal bearing plate 46. Aligned apertures extend through the plate 46 and the lower flange of each I beam 12 and 14 through which bolts pass to secure each bracket 40 rigidly to the frame. The apertures may be dispensed with and the plate 46 welded directly to the frame 10.

The vertical hanger plates 42 and 44, which may be suitably reinforced as desired or necessary, comprise an aperture 50 (FIG. 4) whereby each bracket 40 is pivotally journalled to the remainder of the associated suspension support structure 36. An axle mechanism 54 is journalled in the apertures 50 of each mounting bracket 40 to insure rotational displacement of the front wheel 38 about the axis of the axle mechanism 54 which is perpendicular to the plane of the wheel or tilting of the vehicle frame in relation to each suspension system support structure 36.

With particular reference to FIGS. 4, 5 and 8, it is to be noted that each plate 42 and 44 define edges which downwardly converge and each contains the mentioned aperture 50 through which a sleeve or boss 58 is snugly passed and welded so that a substantial length 60 of the boss extends outward and a shorter length 62 of the boss extends inward. The interior surface 64 (FIG. 8) of the boss thus comprises a bushing through which axle shaft 66 rotatably passes and about which pivotal movement of the support structure 36 in relation to the vehicle frame is accommodated.

The axle shaft 66, as best shown in FIG. 8, passes through a sleeve 68 which is interiorly stepped at 70 and 72 to non-rotatably receive bushings 74 and 76. A thrust washer 78 is interposed between each boss 58 and the adjacent end of the sleeve 68 to provide for the indicated rotation. The exterior of the sleeve 68 is rigidly fixed to a vertical post 80, as by welding or the like, the post 80 comprising a hollow box-shaped configuration defining front and back end walls 82 and 84 and side walls 86 and 88.

With reference to FIGS. 3 and 4, the forward wall 92 of a horizontally-directed reinforcing box is welded or otherwise secured to the exterior face of the rear end wall 84 of the vertical column 80. A triangularly-shaped gusset plate 100 spans between the exterior surface of the wall 84 and the top exterior surface of the top wall 94 of the horizontally-directed reinforcing box 90 and is secured in the indicated relation by weldments or the like. In like manner, gusset plate 102 spans between and is secured to the external surface of the lower wall 96 of the reinforcement 90. The lateral ends of the reinforcement box 90 are closed cover plates 97 and 99.

A longitudinally-directed pivot shaft 110 (best illustrated in FIGS. 3, 4 and 7) projects through an appropriately located and sized aperture (not shown) in wall 84 of the column 80 and is secured thereto by welding or the like. In like manner, the shaft 110 is also rigidly secured to the reinforcement 90. Interposed between the rear surface of the wall 98 of the reinforcement 90 and the front edge 112 of a bearing sleeve 114 is thrust washer 117. As shown best in FIG. 7, the sleeve 114 is internally stepped at 116 and 118 to non-rotatably receive end bushings 120 and 122. Thus the sleeve 114 is rotatably journalled upon the fixed pivot shaft 110.

The trailing end 124 of the shaft 110 is of reduced diameter and is threaded to receive a nut 126 with a retainer washer 128 firmly interposed between the trailing end 130 of the sleeve 114 and the leading face 132 of the nut 126. If desired, a cotter pin or the like may be used to secure the nut 126 in tightened relation on the threaded end 124.

A pair of oppositely extending square axles 140 and 142 are provided. Opposed ends of the axles 140 and 142 merge with and are welded at one end each to the exterior of the sleeve 114 so as to be rigidly associated therewith.

As can be seen by reference to FIG. 4, each axle 140 and 142 comprises top and bottom plates 144 and 146 as well as front and rear plates 148 and 150. Thus, each axle 140 and 142 is interiorly hollow. However, a conventional stepped spindle 152 is fitted at one end thereof within the distal end of each axle 140 and 142 and is secured in fixed relation therein by a suitable weldment or the like. Each spindle 152 accepts a conventional wheel hub 154, shown in dotted lines in the Figures, upon which a wheel is conventionally mounted for rotation.

A pair of spaced vertically-extending rear axle upper gusset plates 160 and 162 surmount the two square axles 140 and 142 and are welded to the top plate 144 of each along two spaced interfaces 164, for the purpose of adequately reinforcing the axles 140 and 142. A central longitudinally-directed stiffener 166 adds to the reinforcement and is appropriately secured as by welding to the gusset plates 160 and 162 and to top plate 144. A single vertically-extending rear axle lower gusset plate 170 also reinforces the two axles 140 and 142 and is secured at interface 172 to the bottom plate 146 of both axles 140 and 142. Also, gusset plates 160 and 162 are arched at 174 while gusset plate 170 is arched at 176 to contiguously receive the sleeve 114, the two arches 174 and the one arch 176 being secured to the sleeve 114, as be welding.

From the foregoing, it is to be appreciated that the wheels respectively carried upon spindles 152 at the end of axles 140 and 142 may pivot in a vertical plane about pivot shaft 110 as irregularities in terrain are encountered.

With particular reference to FIGS. 3, 4 and 5, it is to be observed that a horizontally-directed rectangular or square cross member 180 perpendicularly intersects the column 80. Specifically, the cross member 180 is comprised of top and bottom plates 182 and 184 as well as front and rear plates 186 and 188. The cross member 180 passes through appropriately located and sized square or rectangular openings 190 oppositely disposed in walls 86 and 88 of the column 80 and is secured therein by welding or the like. The cross member 180 projects a considerable distance outward from the wall 86 of the column 80 and has secured at the distal end thereof a forwardly directed arm 190, which is rigidly secured, as by welding or the like, to the exterior of the walls 182, 184, 186 and 188 of the cross member 180. Gusset plates 192 and 194 bridge between the column 80 and the arm 190 and are secured respectively thereto as well as to the walls 182 and 186 respectively as by welding or the like, so that adequate reinforcement is provided for each structure 36.

The arm 190, in addition to providing apertures which receive and are welded firmly to the cross member 180, is comprised of spaced side walls 200 and 202, end walls 204 and 206, top wall 208 and bottom wall 210. Consequently, the arm 190 is an enclosed box which tapers in a forward direction as best illustrated in FIG. 4.

The leading end of the arm 190 comprises spaced circular apertures 220 disposed in walls 200 and 202 through which another spindle 152 extends and is secured by welding or the like so that the stepped end of the spindle projects from the plate 202 generally in a horizontal attitude and receives a wheel hub 154 to which the front wheel is secured.

The spindle 152, secured at the leading end of the arm 190, is reinforced by top and bottom gusset plates 222 and 224 respectively secured to the large diameter portion of the spindle and to the wall 202 of the arm 190.

By reason of the described arrangement, the front wheel together with the arm 190 is permitted to rotate about the main shaft 66 as irregular terrain is traversed by the leading wheel. As a consequence, the rear wheels 38 will move up and down through a distance somewhat less than the distance oppositely traversed by the front wheel, depending upon the lever arm distances from the mentioned wheels to the axle 66. Accordingly, tilting of the frame or bed of the vehicle about the suspension system in respect to the wheels can be accomplished.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are therefore to be embraced therein.

What is claimed and desired to be secured by United States Letters Patent is:

1. A vehicle suspension mechanism to accommodate tilting of a frame in respect to support wheels for rearward ground unloading comprising:
   load-transferring structure comprising means for pivotally attaching the vehicle suspension mechanism to the frame of the vehicle, said attaching means defining a horizontally-directed single main pivot axis across which the load is transferred accommodating said tilting,
   forward ground-engaging wheel means carried by a forward extension of the load transferring structure, the forward extension being disposed a relatively long distance in front of the single main pivot axis,
   rearward ground-engaging wheel means carried by a rearward extension of the load-transferring structure, the rear extension being disposed a relatively short distance to the rear of the main pivot axis,
   axle means rotatably interposed between one of the wheel means and the associated extension of the load-transferring structure, the one wheel means comprising at least two wheels, one at each of the opposite ends of the axle means.

2. A vehicle suspension mechanism comprising:
   load-transferring structure comprising means for pivotally attaching the vehicle suspension mechanism to a frame of the vehicle, said attaching means defining a horizontally-directed single main pivot axis across which the load is transferred accommodating relative rotation of the vehicle and the load-transferring structure,
   forward ground-engaging wheel means carried by a forward extension of the load transferring structure, the forward ground-engaging wheel means being disposed a substantial distance in front of the single main pivot axis,
   rearward ground-engaging wheel means carried by a rearward extension of the load-transferring structure, the rear ground-engaging wheel means being disposed a distance to the rear of the main pivot axis, axle means rotatably interposed between one of the wheel means and the associated extension of the load-transferring structure, the one wheel means comprising at least two wheels, one at each of the opposite ends of the axle means, wherein the load-transferring structure comprises a main axle shaft which provides said main pivot axis, a rigid main support disposed directly below and rotatably joined to the main axle shaft, first cantilever beam means rigidly joined at its proximal end to the main support and comprising one of said extensions, the first cantilever beam means being rigidly joined near its distal end to spindle means which carry the associated wheel means, second cantilever beam means rigidly joined at its proximal end to the main support and comprising the other of said two extensions, the second cantilever beam means extending away from the main support in a direction generally opposite to that of the first cantilever beam means, the second cantilever beam means defining a second pivot axis comprising said axle means, a rigid cross member centrally and rotatably joined upon the axle means of the second cantilever beam means toward the distal end thereof for rotation of the cross member about the second pivot axis, with at least one wheel being carried at each of the two distal ends of the cross member.

3. A suspension system comprising:
forward ground-engaging wheel means;
forward longitudinally-extending cantilever means;
first journal means carried by the forward cantilever means to which the forward wheel means are journaled;
rearward ground-engaging wheel means;
rearward longitudinally-extending cantilever means;
second journal means carried by the rearward cantilever means to which the rearward wheel means are journaled;
one journal means comprising short axle means rigidly fastened to the associated cantilever means, the other journal means comprising laterally-extending opposed arms and means at a free end of each arm to which at least one wheel is rotatably journaled, each arm being joined by rotatable coupling means to the associated cantilever means;
hanger structure to which a rearward portion of the forward cantilever means is joined remote from the forward wheel means and to which a forward portion of the rearward cantilever means is joined remote from the rearward wheel means, the hanger structure defining bracket means adapted to be secured to the undercarriage of a vehicle and defining a main shaft, the axis of which accommodates relative rotation of the vehicle and the suspension system, the main shaft being disposed remote from both wheel means.

4. In a vehicle:
a frame upon which a load is to be supported;
a downwardly-extending bracket mounted to the frame;
a main pivot shaft rotatably carried by the bracket;
a rigid support body rotatably coupled to the main pivot shaft and being mainly situated below the frame, the rigid support body defining a forwardly-extending projection and a rearwardly-extending projection;
front and rear transverse wheel supports, one transverse wheel support spanning to at least one transverse location different from at least one transverse location spanned to by the other transverse wheel support;
front and rear wheel means respectively carried in journaled relation at the front and rear transverse wheel supports such that no wheel follows in the track of another wheel.

5. In a vehicle:
a frame upon which a load is to be supported, the frame being tiltable such that the back end can be lowered until it is immediately adjacent the ground for removing the load;
a downwardly-extending bracket mounted to the frame at a location such that the frame extends a substantial distance both forward and rearward beyond the bracket mounting site;
a main pivot shaft rotatably carried by the bracket;
a rigid support body rotatably coupled to the main pivot shaft to accommodate said tilting and being mainly situated below the frame, the rigid support body defining a forwardly-extending projection of a relatively long length and a rearwardly-extending projection of a relatively short length;
front and rear wheel means respectively carried in journaled relation by the forward projection and rearward projection longitudinally remote from the main pivot shaft;
one of said wheel means comprising a transverse member journaled to one of said projections and having two spaced and oppositely-directed free ends with at least one wheel carried adjacent to each free end.

* * * * *